(12) United States Patent
Huh (10) Patent No.: US 8,462,669 B2
(45) Date of Patent: Jun. 11, 2013

(54) METHOD AND APPARATUS FOR DETERMINING PT SERVER HAVING CONTROLLING FUNCTION

(75) Inventor: Kang-Suk Huh, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1132 days.

(21) Appl. No.: 12/092,951

(22) PCT Filed: Oct. 20, 2006

(86) PCT No.: PCT/KR2006/004290
§ 371 (c)(1),
(2), (4) Date: May 7, 2008

(87) PCT Pub. No.: WO2007/055478
PCT Pub. Date: May 18, 2007

(65) Prior Publication Data
US 2008/0285486 A1    Nov. 20, 2008

Related U.S. Application Data

(60) Provisional application No. 60/735,897, filed on Nov. 14, 2005.

(30) Foreign Application Priority Data

Aug. 14, 2006 (KR) .................. 10-2006-0076891

(51) Int. Cl.
*H04L 12/16* (2006.01)
(52) U.S. Cl.
USPC ................ 370/260; 709/208; 455/519
(58) Field of Classification Search
USPC ............ 455/519, 518; 370/230, 352, 395.42, 370/260, 447, 270, 312; 709/208, 225, 229, 709/206; 726/15
See application file for complete search history.

(56) References Cited

U.S. PATENT DOCUMENTS

| | | | | |
|---|---|---|---|---|
| 5,471,646 | A * | 11/1995 | Schultz | 455/519 |
| 7,561,892 | B2 * | 7/2009 | Huh et al. | 455/518 |
| 7,751,358 | B2 * | 7/2010 | Kuure et al. | 370/312 |
| 2003/0002442 | A1 * | 1/2003 | Flammer et al. | 370/230 |
| 2003/0153341 | A1 * | 8/2003 | Crockett et al. | 455/519 |

(Continued)

FOREIGN PATENT DOCUMENTS

| | | |
|---|---|---|
| KR | 10-2002-0060960 A | 7/2002 |
| KR | 10-2004-0102722 A | 12/2004 |
| KR | 10-2004-0093802 A | 11/2005 |
| WO | WO-2004/075581 A1 | 9/2004 |
| WO | 2005/104477 A1 | 11/2005 |

*Primary Examiner* — Melanie Jagannathan
*Assistant Examiner* — Parth Patel
(74) *Attorney, Agent, or Firm* — Birch, Stewart, Kolasch & Birch, LLP (57) ABSTRACT

Disclosed is a method and apparatus for determining a controlling PT server. A mobile communication terminal transmits a group generation request message to a PT XDMS, and the PT XDMS determines a specific PT server having the largest number of members as a controlling PT server. The PT XDMS generates group identity information by using an address of the specific PT server, and transmits a group generation response message including the group identity information to the mobile communication terminal. Then, the mobile communication terminal transmits the group identity information of the group generation response message to a PT server with being included in an INVITE message. The PT server certifies the group identity information included in the INVITE message, and determines whether or not itself is to be operated as a controlling PT server.

13 Claims, 4 Drawing Sheets

U.S. PATENT DOCUMENTS

| | | | |
|---|---|---|---|
| 2005/0243835 A1* | 11/2005 | Sharma et al. | 370/395.42 |
| 2005/0256935 A1* | 11/2005 | Overstreet et al. | 709/208 |
| 2005/0267969 A1* | 12/2005 | Poikselka et al. | 709/225 |
| 2006/0041939 A1* | 2/2006 | Schwartzman et al. | 726/15 |
| 2006/0053208 A1* | 3/2006 | Laurila et al. | 709/206 |
| 2006/0056440 A1* | 3/2006 | Khartabil | 370/447 |
| 2006/0062206 A1* | 3/2006 | Krishnaswamy | 370/352 |
| 2006/0089998 A1* | 4/2006 | Kim et al. | 709/229 |
| 2006/0140173 A1* | 6/2006 | Hoover | 370/352 |
| 2008/0008106 A1* | 1/2008 | Boberg et al. | 370/270 |

* cited by examiner

METHOD AND APPARATUS FOR DETERMINING PT SERVER HAVING CONTROLLING FUNCTION

TECHNICAL FIELD

The present invention relates to a session-based service, and more particularly, to a method and apparatus for determining a PT server having a controlling function in a session initiation protocol (SIP)-based service.

BACKGROUND ART

In general, a session initiation protocol (SIP) is a signaling protocol for identifying each location of terminals to be communicated with each other, and representing procedures for generating, deleting, or changing a multimedia-service session therebetween. The SIP-based service has a request/response structure for controlling generation, correction, and completion of a multimedia-service. The SIP-based service is provided without being dependent on an internet protocol (IP) address by using an SIP URL similar to an E-mail address so as to identify each user.

The SIP-based session service includes a push talk (PT) service. The PT service is for providing communication of a high speed to a service provider and a mobile communication user. The PT service is a semi-double communication service for transmitting media data (talk burst) to one or more clients by one session-set client. The PT service may include one of a PoC (PTT over cellular) service for transmitting audio data, a PTV (push to view) service for transmitting video data, or a PTD (push to data) service for transmitting data.

The PT service allows 1-to-1 communication (a single recipient) or 1-to-many communication (group chat session), and uses an SIP (session initiation protocol) for setting a session.

According to the PT service, one client may invite another client to a PT session according to each client or each group to which the client belongs. That is, if a specific PT client invites one or more PT clients to a PT session by a selection, a session is set therebetween. Accordingly, media data is transmitted to the session-set PT clients.

A PT server may execute a controlling function, or a participating function, or both the controlling function and the participating function.

Each processor for implementing the participating function and the controlling function is called as a participating function unit and a controlling function unit.

The controlling function unit executes a centralized session process, a media distribution, a control for a talk burst including a talker's identity, and provides a policy for participating in a group session and a participant's information, etc. Also, the controlling function unit provides a policy regarding a corresponding session process and a session input, and provides a media relaying function and a talk burst control message-relaying function between the PT client and the controlling function unit.

When n PT clients are session-set to the PT server, the PT server includes n participating function units corresponding to the n PT clients one to one, and one controlling function unit for controlling the PT clients by the participating function units.

When clients participating in a session belong to one or more PT servers, the participating function unit and the controlling function unit may belong to PT servers different from each other.

In case of a chat PT group session and a pre-arranged PT group session, a PT server allocated to a group identity has to execute a controlling function for a PT service of the group. That is, the PT server mapped to the group identity (PT server having the group identity) has to be provided with a controlling function unit thus to be operated as a PT server having a controlling function.

The group identity is an ID of a group. The pre-arranged PT group session is a continuous group session identity consisting of PT members (PT clients). A chatting group is a continuous PT group in which PT clients individually participate for a group session with other PT clients. Accordingly, when the chatting group is session-set, other members (other PT clients) thereof are not necessarily invited thereto. Other members have to individually participate in the chatting group.

Figure 1:
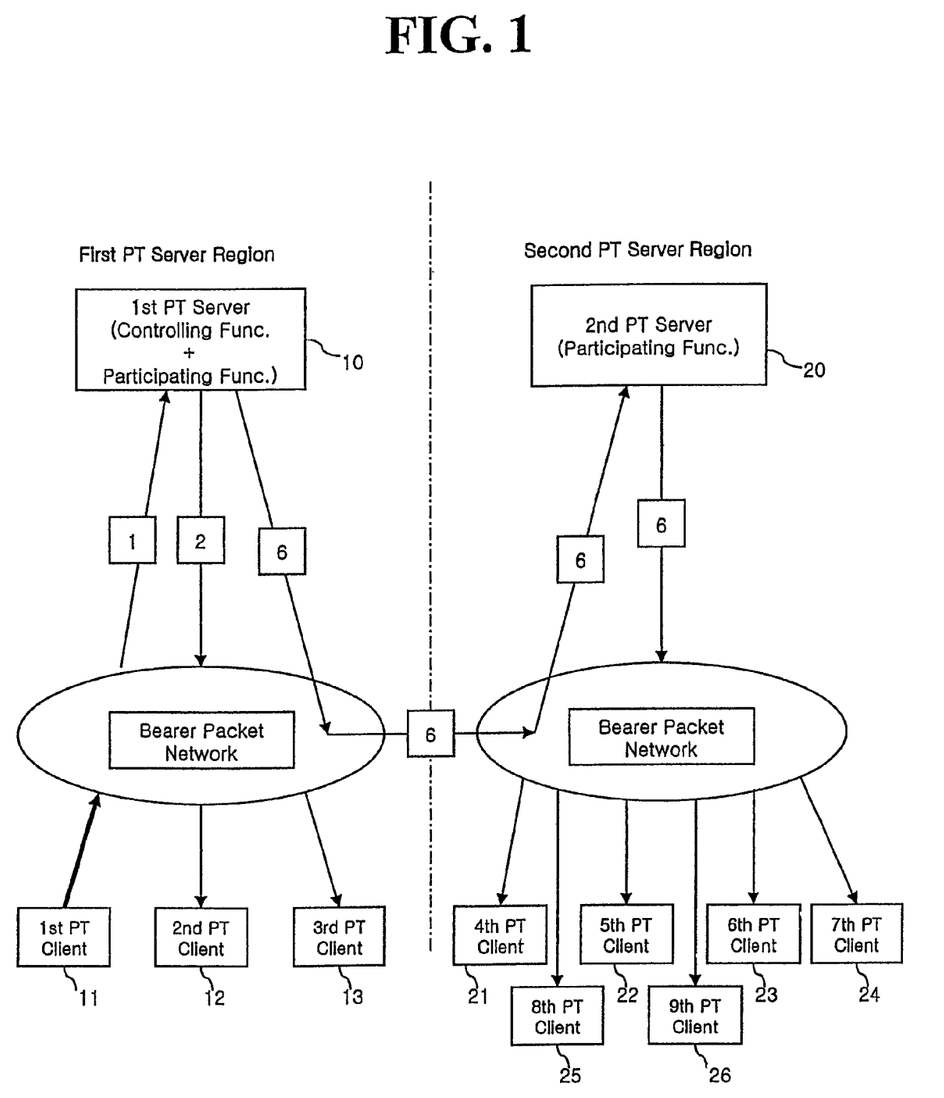
FIG. 1 is a view showing a PT system in which a PT server having a controlling function is determined according to a method for determining a PT server having a controlling function in accordance with the related art.

FIG. 1 shows a PT system in which a PT server having a controlling function has been determined according to a method for determining a PT server having a controlling function in accordance with the related art. Hereinafter, will be explained an amount of traffics generated when a plurality of clients that belong to different PT servers are session-set in the PT system.

It is assumed that first to third PT clients (11-13) among first to ninth PT clients (11-13, 21-26) belong to a first PT server 10, and fourth to ninth clients (21-26) belong to a second PT server 20. When a PT server having a group identity of the group is the first PT server 10, the first PT server 10 is operated as a PT server having a controlling function of the group. The group identity is an ID of a group. When determining a PT server to have the group identity, a traffic generation amount is not considered. The second PT server 20 executes a participating function.

When the first PT client 11 generates a media traffic, the media traffic is transmitted to the first PT server 10 to which the first PT client 11 belongs through a bearer packet network such as general packet radio service (GPRS). The first PT server 10 having a controlling function generates media traffics corresponding to the number of the second to ninth PT clients (12-13, 21-26) except the first PT client 11 thus to transmit the generated media traffics to the second to ninth PT clients (12-13, 21-26).

That is, the first PT server 10 generates two media traffics for transmission to the second and third PT clients (12-13) that belong thereto, and generates six media traffics for transmission to the second PT sever 20 to which the fourth to ninth PT clients (21-26) belong. The generated six media traffics are transmitted to the second PT server 20 through a GPRS.

The second PT server 20 transmits the media traffics to the six session-set PT clients (21-26).

However, in the related art method for determining a PT server having a controlling function, a PT server having a group ID is determined as a PT server having a controlling function, and an amount of traffics generated from a PT system is not considered. Accordingly, traffics having an unnecessarily excessive amount are generated.

DISCLOSURE OF THE INVENTION

Therefore, it is an object of the present invention to provide a method and apparatus for determining a PT server having a controlling function capable of reducing an amount of traffics so as to provide a PT service to PT clients of a group.

In a method for generating a group including a plurality of PT clients that belong to different PT servers, a PT database server determines a specific PT server having the largest number of PT clients as a PT server having a controlling function.

To achieve these objects, there is provided a method for determining a PT server having a controlling function, comprising: transmitting a group generation request message to a network by a mobile communication terminal; receiving a group generation response message including group identity information of a group from the network; and transmitting an INVITE message including at least the group identity information of the group generation response message.

In an apparatus for determining a PT server having a controlling function among different PT servers of a group, a mobile communication terminal comprises an XDM client for transmitting a group generation request message to a specific network element, receiving a group generation response message including at least group identity information of a group from the specific network element, the group generated by the group generation request message; and a PT client for transmitting an INVITE message including at least the group identity information of the group generation response message.

MODES FOR CARRYING OUT THE PREFERRED EMBODIMENTS

Hereinafter, will be explained a method and apparatus for determining a PT server having a controlling function according to the present invention.

In the present invention, a mobile communication terminal transmits a group generation request message, and a PT database server having received the group generation request message determines a specific PT server having the largest number of members of a group as a PT server having a controlling function (hereinafter, "a PT server having a controlling function" can be referred as to "a controlling PT server"). The PT database server generates group identity information by using an address of the specific PT server, and transmits a group generation response message including the group identity information to the mobile communication terminal.

The mobile communication terminal transmits an INVITE message including at least the group identity information to a network. The specific PT server having received the INVITE message certifies the group identity information included in the INVITE message thus to recognize itself as a PT server having a controlling function, and executes a controlling function for the group session.

The mobile communication terminal comprises: an XDM client for transmitting a group generation request message to the PT database server through a specific network, an aggregation proxy, and receiving a group generation response message including at least group identity information generated by using an address of a specific PT server having the largest number of members through the aggregation proxy; a PT client for generating an INVITE message including at least the group identity information of the group generation response message.

The PT database server includes a processor for certifying a PT service identity (conference-factory-URI) allocated to each terminal (each PT client) of a group when the group generation request message is received, determining a specific PT server having the largest number of terminals (PT clients) as a controlling PT server, generating group identity information of the group by using an address of the controlling PT server, and transmitting the group generation response message including the group identity information to the mobile communication terminal.

The group includes a chatting PT group, and a pre-arranged PT group. The group consists of a plurality of terminals that belong to different PT servers, that is, a plurality of PT clients. Hereinafter, a mobile communication terminal, a PT user, and a PT client will be referred to as the same factor for convenience.

Figure 2:
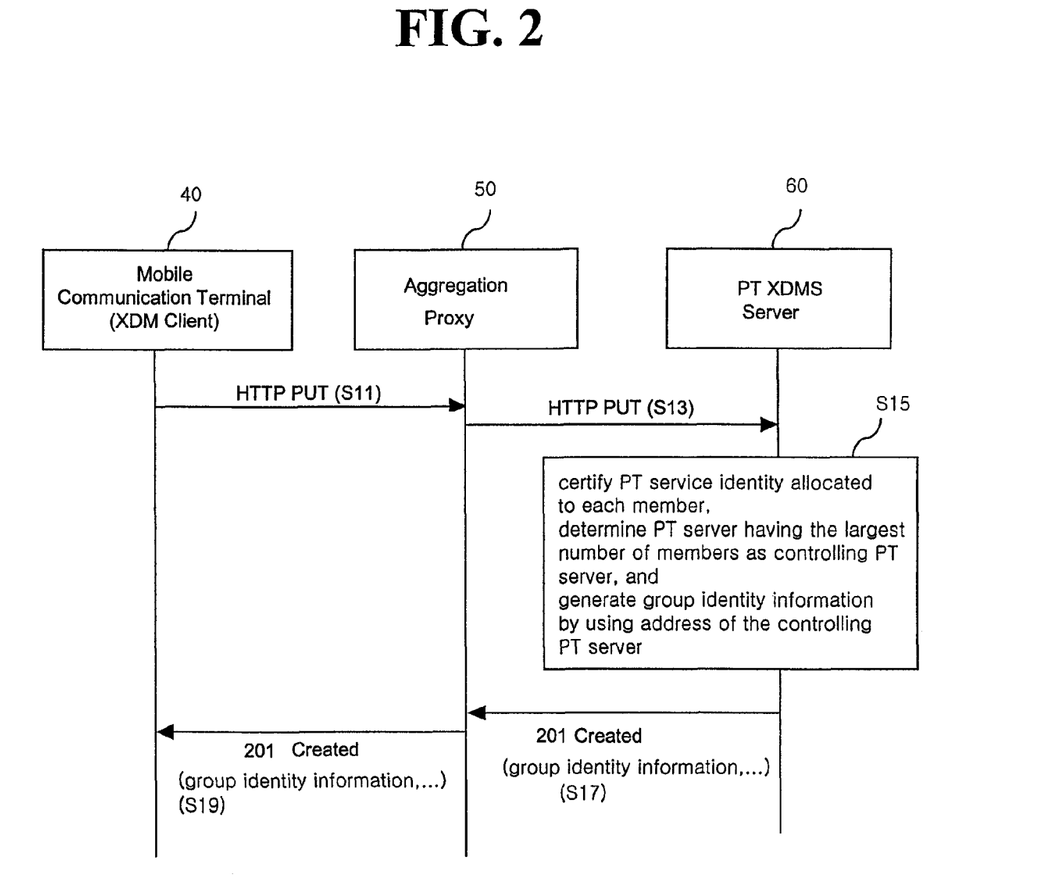
FIG. 2 is a view showing a method for determining a PT server having a controlling function at the time of generating a PT group according to the present invention.

FIG. 2 is a view showing a method for determining a PT server having a controlling function (a controlling PT server) at the time of generating a PT group according to the present invention.

In a general PT system, each mobile communication terminal, that is, each PT client is allocated with a PT service identity (conference-factory-URI). The PT service identity allocated to each of the PT clients is stored in a PT database server or another server according to each of the PT clients. The PT service identity allocated to each of the PT clients represents an address (e.g., SIP URI) of a specific PT server for directly owning/hosting/serving a specific PT client among several PT servers.

When a specific mobile communication terminal (XDM client) 40 transmits a group generation request message (HTTP PUT) in order to request a group generation (S11), an aggregation proxy 50 transmits the HTTP PUT message to a PT database server (PT XDMS server) 60 (S13).

Then, the PT database server 60 certifies a specific PT server having the largest number of members (PT clients) of a group generated by using the PT service identity allocated to each of the PT clients included in the HTTP PUT message.

The PT service identities allocated to the PT clients may be stored not only in the PT database server 60, but also in another server. When the PT service identities allocated to the PT clients are stored in another server rather than the PT database server 60, the PT database server 60 requests said another server to obtain the PT service identities of the PT clients.

Then, the PT database server 60 generates group identity information of the group by using an address of the specific PT server (S15). Although not shown in FIG. 2, the PT database server 60 includes a processor. The processor determines a specific PT server having the largest number of members as a PT server having a controlling function, and generates group identify information by using an address of the specific PT server.

Then, the PT database server 60 transmits a response (a group generation response message) (201 Created) with respect to the group generation request (S17). The response is transmitted to the specific mobile communication terminal (XDM client) 40 through the aggregation proxy 50 (S19).

When a group is to be generated in the present invention, the PT database server certifies a specific PT server having the largest number of PT clients of the group as a PT server having a controlling function, and generates group identity information of the group by using an address of the PT server having a controlling function. The group identity information includes an address (SIP address) of the PT server having a controlling function.

For instance, when generated group identity information is mybudylist@PTServerX.lgt.com, the PT Server X has the largest number of members, the PT Server X is determined as a PT server having a controlling function, and the PT Server X has an address of PTServerX.lgt.com. The group identity information includes a mybudylist, an ID of a group.

A specific PT client, that is, a specific terminal receives group identify information including an address of a specific PT server having the largest number of members from a PT XDMS server. Then, the specific terminal transmits the group identity information to a network with being included in an INVITE message.

Hereinafter, a method for determining a PT server having a controlling function in case of setting a PT group session will be explained. The PT group includes a plurality of clients that belong to different PT servers.

Figure 3:
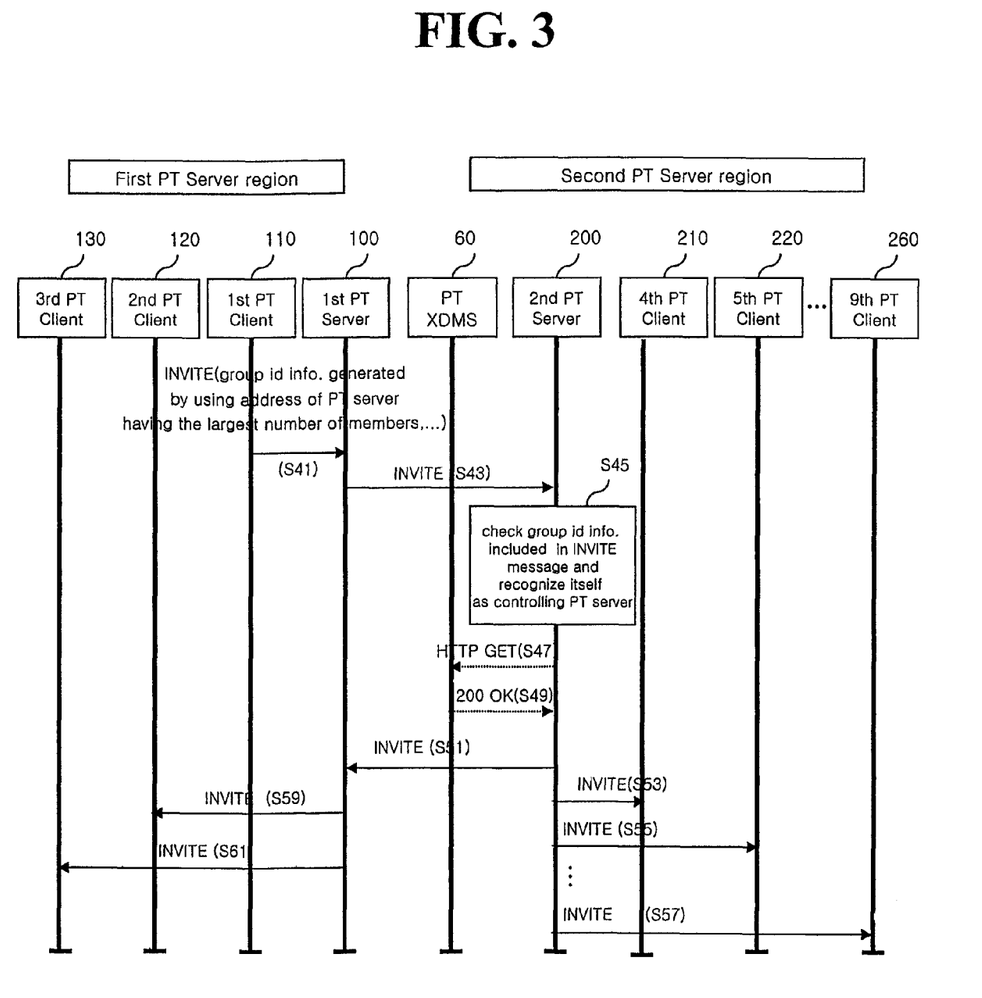
FIG. 3 is a view showing a method for determining a PT server having a controlling function at the time of setting a group session according to the present invention.

FIG. 3 is a view showing a method for determining a PT server having a controlling function at the time of setting a group session according to the present invention.

Among first to ninth PT clients (11-13, 21-26) of a group, the first to third PT clients (11-13) belong to a first PT server 10, and the fourth to ninth clients (21-26) belong to a second server 20.

The first PT client 11 transmits an INVITE message to the first PT server 10 through a bearer packet network so as to session-set a chatting PT group or a pre-arranged PT group. The INVITE message includes at least group identity information including information of a PT server having a controlling function.

As shown in FIG. 2, the group identity information is generated by a PT XDMS server 60. The information of the PT server having a controlling function includes an address of a specific PT server having the largest number of members among different PT servers of a group. That is, the PT XDMS server 60 certifies a specific PT server having the largest number of members thus to determine it as a PT server having a controlling function. Then, the PT XDMS server 60 generates the group identity information by using an address of the PT server having a controlling function, and provides the generated group identity information to a corresponding PT client (the first PT client 11) through an aggregation proxy (S41).

The first PT server 100 certifies group identity information included in the INVITE message. If the first PT server 100 does not have the group identity information, it transmits the INVITE message to another PT server. For instance, when the group identity information is mybudylist@ PTServerX.lgt.com, the first PT server 100 does not have the address of mybudylist@ PTServerX.lgt.com. Accordingly, the first PT server 100 transmits the INVITE message to another PT server.

When the second PT server (PT Server X) 200 receives the INVITE message (S43) and has group identity information included in the INVITE message, it recognizes itself as a PT server having a controlling function (S45).

Herein, since the PT XDMS server has determined a specific PT server having the largest number of members as a PT server having a controlling function and has generated the group identity information by using an address of the specific PT server, the group identity information includes the address of the PT server having a controlling function. Accordingly, the PT server having the group identity information is implemented as the PT server having a controlling function, and is also implemented as the specific PT server having the largest number of members.

The second PT server 200 transmits an HTTP GET message to the PT XDMS server 60, thereby requesting detailed attribution information of each of the members of the group (S47).

The PT XDMS server 60 transmits a response message (200 OK) to the second PT server 200, and provides the requested detailed attribution information (S49). The detailed attribution information of each of the members of the group includes at least an address list of each of the members.

Then, the second PT server 200 generates 6 INVITE messages to be transmitted to the fourth to ninth PT clients (210-260), and transmits them to the fourth to ninth PT clients (210-260) through a bearer packet network, respectively (S53, S55 and S57).

The second PT server 200 generates 2 INVITE messages to be transmitted to the second and third PT clients (120-130) that belong to the first PT server 100, and transmits them to the first PT server 100 (S51).

The first PT server 100 transmits the two received INVITE messages to the second and third PT clients 120 and 130 by executing a PT participating function (S59, S61).

Figure 4:
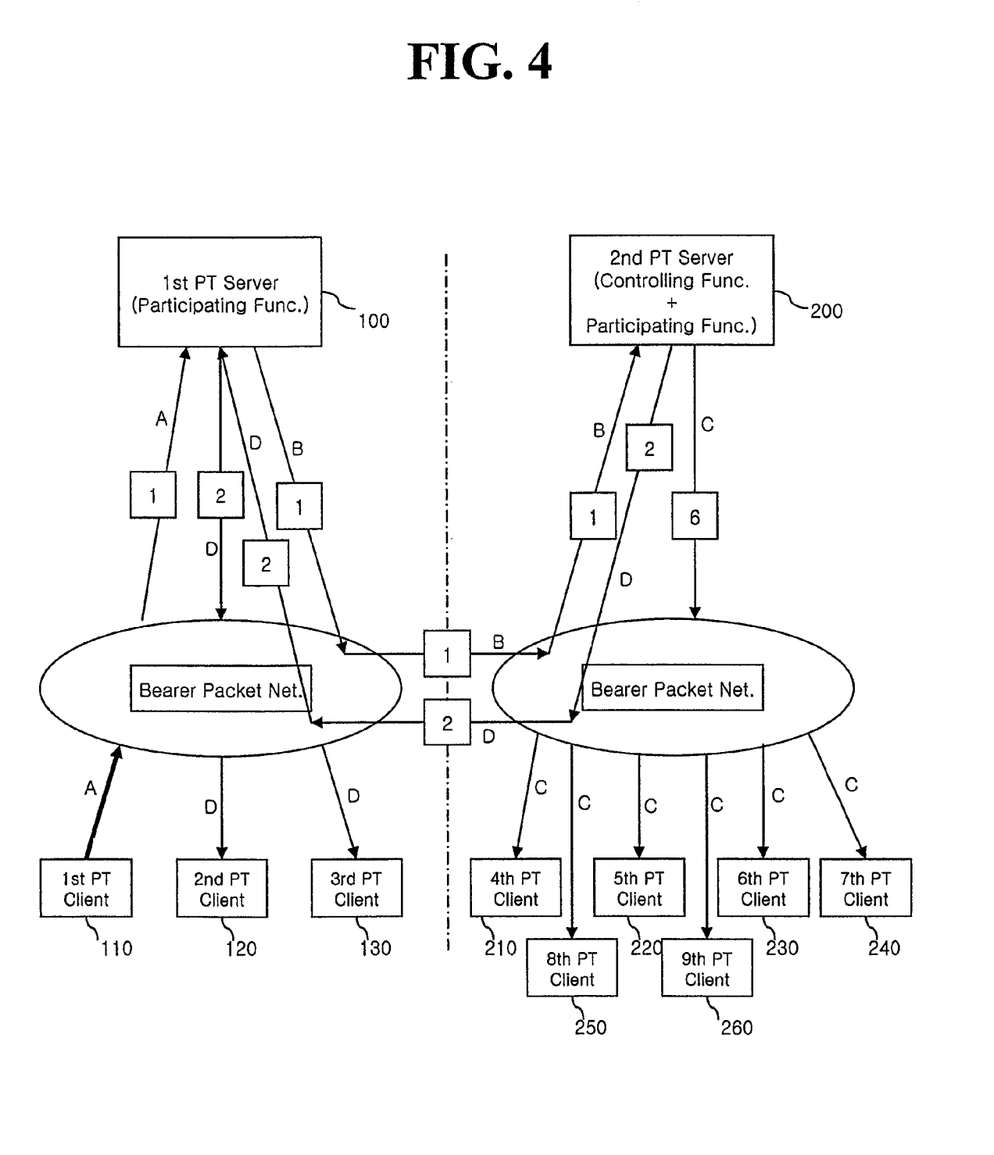
FIG. 4 is a view showing an amount of traffics generated in a PT system at the time of determining a PT server having a controlling function according to the present invention.

FIG. 4 is a view showing an amount of traffics generated in a PT system at the time of determining a PT server having a controlling function according to the present invention.

When the first PT client 110 generates media traffics, the media traffics are transmitted to the first PT server 100 to which the first PT client 110 belongs (A).

The first PT server 100 having a participating function transmits the media traffics to the second PT server 200 having a controlling function (B).

The second PT server 200 generates 6 media traffics thus to transmit them to the PT clients (210-260) that belong thereto (C).

The second PT server 200 generates 2 media traffics so as to transmit them to the second and third PT clients 120 and 130 that belong to the first PT server 100, thereby transmitting them to the first PT server 100 (D).

The first PT server 100 transmits the two received media traffics to the second and third PT clients 120 and 130 by executing a PT participating function (D).

In the aforementioned embodiment, one media traffic was generated. However, the first PT client 110 generates INVITE messages with a corresponding number in the same manner as the media traffic generation.

Accordingly, an amount of traffics generated in a PT system of FIG. 4 is less than an amount of traffics generated in a PT system of FIG. 1.

In the present invention, the PT XDMS server generates group identity information by using an address of a PT server having the largest number of members, and transmits a group generation response message including the group identity information to the mobile communication terminal. Then, the mobile communication terminal transmits an INVITE message including the group identity information to a network. Accordingly, a PT server having the group identity information is operated as a PT server having a controlling function, thereby reducing an amount of traffics generated between PT clients.

As aforementioned, in the present invention, a specific PT server having the largest number of members of a group is determined as a PT server having a controlling function.

Accordingly, an amount of traffics generated between the members and the PT servers can be reduced.

Furthermore, in the present invention, a PT XDMS server having received a group generation request message determines a specific PT server having the largest number of PT clients of a group as a PT server having a controlling function. Accordingly, a PT server having received an INVITE message need not execute an additional procedure for determining a PT server having a controlling function, thereby simplifying a session-setting procedure.

Besides, in the present invention, group identity information is generated by using an address of a specific PT server having the largest number of members. Accordingly, when a PT server having group identity information is determined as a PT server having a controlling function, the specific PT server having the largest number of members can be operated as the PT server having a controlling function.

It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A method for determining a controlling push-to talk (PT) server using a mobile communication terminal, the mobile communication terminal including a transceiver, a memory, an XDM (eXtended markup language Document Management) client, and a PT client, the method comprising:

sending and receiving, by the transceiver, radio signals via a mobile communication network;

transmitting, by the XDM client via the transceiver, a group generation request message to a specific network component, and receiving a group generation response message including at least group identity information of a group for a PT service from the specific network component, the group generated according to the group generation request message, wherein the group generation request message is a message used to request generation of the group, wherein a specific PT server having a largest number of PT clients among a plurality of PT servers each serving one or more different PT clients is selected as a controlling PT server for providing the PT service to the group, by using a PT service identity allocated to each PT client respectively, wherein the selected specific PT server is for performing a controlling function for the PT service, while non-selected PT servers in the mobile communication network are for performing a participating function for the PT service, wherein the PT service identity allocated to each PT client respectively is certified by the specific network component, when the group generation request message is transmitted to the specific network component, and wherein the group identity information is generated by determining the specific PT server having the largest number of members as the controlling PT server, and by using an address of the controlling PT server by a PT database server;

storing, in the memory, information and data comprising the group identity information included in the group generation response message; and transmitting, by the PT client via the transceiver, an INVITE message including at least the group identity information of the group generation response message.

2. The method of claim 1, wherein the PT client transmits the INVITE message to a PT server among the plurality of PT servers to which itself belongs.

3. The method of claim 1, wherein the group identity information is generated by using an address of the PT server determined as the controlling PT server among the plurality of PT servers by a PT XDMS (eXtended markup language Document Management) server.

4. The method of claim 1, further comprising:
when a PT server, among the plurality of PT servers, having received the INVITE message has the group identity information of the INVITE message, operating that PT server as the controlling PT server.

5. The method of claim 1, further comprising:
when a PT server, among the plurality of PT servers, having received the INVITE message does not have the group identity information of the INVITE message, transmitting by that PT server the INVITE message to another PT server.

6. The method of claim 1, further comprising:
allowing, by a user interface of the mobile communication terminal, an interfacing with a user to allow selection and transmission of the group generation request message.

7. The method of claim 1, wherein the specific network component comprises an aggregation proxy.

8. A mobile communication terminal comprising:
a transceiver configured to send and receive radio signals via a mobile communication network;
a memory configured to store information and data comprising group identity information included in a group generation response message;
an XDM (eXtended markup language Document Management) client configured to transmit, via the transceiver, a group generation request message to a specific network component, and to receive the group generation response message including at least group identity information of a group for a PT (Push-to Talk) service from the specific network component, the group generated according to the group generation request message,
wherein the group generation request message is a message used to request generation of the group,
wherein a specific PT server having a largest number of PT clients among a plurality of PT servers each serving one or more different PT clients is selected as a controlling PT server for providing the PT service to the group, by using a PT service identity allocated to each PT client respectively,
wherein the selected specific PT server is for performing a controlling function for the PT service, while non-selected PT servers in the mobile communication network are for performing a participating function for the PT service,
wherein the PT service identity allocated to each PT client respectively is certified by the specific network component, when the group generation request message is transmitted to the specific network component, and
wherein the group identity information is generated by determining the specific PT server having the largest number of members as the controlling PT server, and by using an address of the controlling PT server by a PT database server; and
a PT client configured to transmit, via the transceiver, an INVITE message including at least the group identity information of the group generation response message.

9. The mobile communication terminal of claim 8, wherein the PT client transmits the INVITE message to a PT server among the plurality of PT servers to which itself belongs.

10. The mobile communication terminal of claim 8, wherein when a PT server, among the plurality of PT servers, having received the INVITE message has the group identity information of the INVITE message, that PT server is operated as the controlling PT server, and that PT server is the PT server having the largest number of members.

11. The mobile communication terminal of claim 8, wherein when a PT server, among the plurality of PT servers, having received the INVITE message does not have the group identity information of the INVITE message, that PT server transmits the INVITE message to another PT server among the plurality of PT servers.

12. The mobile communication terminal of claim 8, further comprising a user interface for interfacing with a user to allow selection and transmission of the group generation request message.

13. The mobile communication terminal of claim 8, wherein the specific network component comprises at least an aggregation proxy.

* * * * *